(12) United States Patent
Casper et al.

(10) Patent No.: US 7,653,165 B2
(45) Date of Patent: *Jan. 26, 2010

(54) PULSE AMPLITUDE MODULATED SYSTEM WITH REDUCED INTERSYMBOL INTERFERENCE

(75) Inventors: Bryan K. Casper, Hillsboro, OR (US); Shekhar Y. Borkar, Beaverton, OR (US); Stephen R. Mooney, Beaverton, OR (US); Aaron K. Martin, Hillsboro, OR (US); Joseph T. Kennedy, Beaverton, OR (US); Matthew B. Haycock, Beaverton, OR (US); James E. Jaussi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/077,987

(22) Filed: Mar. 24, 2008

(65) Prior Publication Data

US 2008/0181331 A1 Jul. 31, 2008

Related U.S. Application Data

(63) Continuation of application No. 10/261,574, filed on Oct. 1, 2002, now Pat. No. 7,391,834.

(51) Int. Cl.
*H03K 7/02* (2006.01)
*H04L 25/34* (2006.01)

(52) U.S. Cl. ...................... 375/353; 375/286

(58) Field of Classification Search ............. 375/295, 375/296, 300, 286, 289, 353, 259, 268, 285; 332/115, 106, 103
See application file for complete search history.

(56) References Cited

U.S. PATENT DOCUMENTS

| | | | |
|---|---|---|---|
| 3,995,264 A | 11/1976 | Ouchi | |
| 4,660,193 A | 4/1987 | Young et al. | |
| 5,301,209 A * | 4/1994 | Wei | 375/265 |
| 5,517,213 A * | 5/1996 | Bhatt et al. | 375/232 |
| 5,550,596 A * | 8/1996 | Strolle et al. | 348/607 |
| 5,832,038 A | 11/1998 | Carsello | |
| 6,026,120 A | 2/2000 | Betts | |
| 6,131,180 A | 10/2000 | Ramesh | |
| 6,334,219 B1 * | 12/2001 | Hill et al. | 725/106 |
| 6,396,329 B1 | 5/2002 | Zerbe | |

(Continued)

OTHER PUBLICATIONS

"U.S. Appl. No. 10/261,574 Response filed Feb. 13, 2008 to Final Office Action mailed Dec. 12, 2007",5 pages.

(Continued)

*Primary Examiner*—Mohammad H Ghayour
*Assistant Examiner*—Vineeta S Panwalkar
(74) *Attorney, Agent, or Firm*—Schwegman, Lundberg & Woessner, P.A.

(57) ABSTRACT

A system and method for encoding and receiving data is provided. The data is encoded as a pulse amplitude modulated signal such that the amplitude signals do not transition from the highest signal level to the lowest signal level and do not transition from the lowest signal level to the highest signal level. The encoding and decoding is performed in some embodiments via a lookup table, and in further embodiments is designed to minimize the step between sequential pulse amplitude modulated symbols.

18 Claims, 2 Drawing Sheets

| | PREVIOUS SIGNAL VALUE | |
|---|---|---|
| INPUT | 0,1 | 2,3 |
| 000 | 00 | 10 |
| 001 | 01 | 11 |
| 010 | 02 | 12 |
| 011 | 10 | 21 |
| 100 | 12 | 23 |
| 101 | 21 | 31 |
| 110 | 22 | 32 |
| 111 | 23 | 33 |

U.S. PATENT DOCUMENTS

| | | |
|---|---|---|
| 6,731,692 B1 | 5/2004 | Bhoja |
| 6,757,334 B1 | 6/2004 | Feher |
| 6,772,351 B1 * | 8/2004 | Werner et al. ............ 713/300 |
| 2003/0095606 A1 | 5/2003 | Horowitz et al. |
| 2003/0108092 A1 | 6/2003 | Gorecki et al. |
| 2003/0174605 A1 | 9/2003 | Sako et al. |

OTHER PUBLICATIONS

"U.S. Appl. No. 10/261,574 Response filed Sep. 27, 2007 to Non-Final Office Action mailed Jun. 27, 2007", 10 pages.

"U.S. Appl. No. 10/261,574 Final Office Action mailed Dec. 12, 2007", FOAR, 17.

"U.S. Appl. No. 10/261,574, Notice of Allowance mailed Feb. 25, 2008", NOAR, 4 Pgs.

"U.S. Appl. No. 10/261,574, Final Office Action mailed Nov. 3, 2006", 10 pgs.

"U.S. Appl. No. 10/261,574, Non-Final Office Action mailed Mar. 7, 2006", 10 pgs.

"U.S. Appl. No. 10/261,574, Non-Final Office Action mailed Jun. 27, 2007", 14 pgs.

"U.S. Appl. No. 10/261,574, Response filed Dec. 29, 2006 Final Office Action mailed Nov. 3, 2006", 9 pgs.

"U.S. Appl. No. 10/261,574, Response filed Jul. 7, 2006 Non-Final Office Action mailed Mar. 7, 2006", 10 pgs.

* cited by examiner

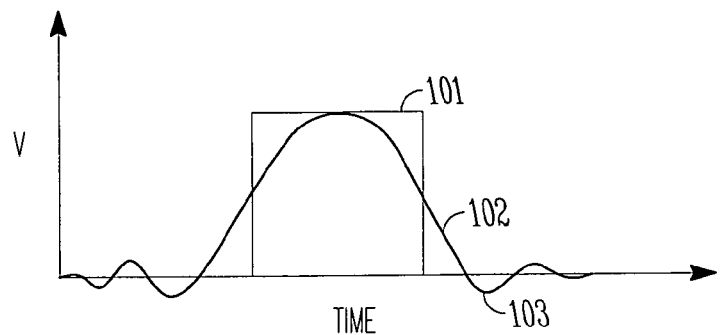
FIG. 1 —PRIOR ART—
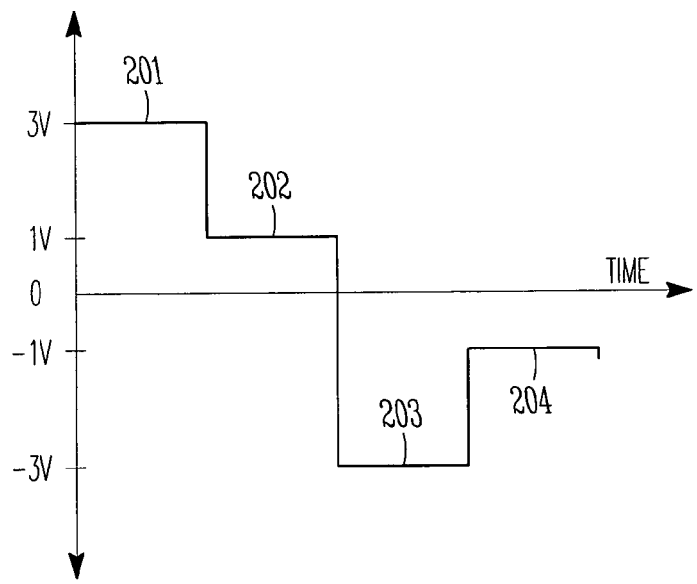
FIG. 2 —PRIOR ART—
| SYMBOL | BIT 0 | BIT 1 |
|--------|-------|-------|
| −3V | 0 | 0 |
| −1V | 0 | 1 |
| +1V | 1 | 0 |
| +3V | 1 | 1 |
FIG. 3 —PRIOR ART—

*FIG. 4* —PRIOR ART—

|  | PREVIOUS SIGNAL VALUE | |
|---|---|---|
| INPUT | 0,1 | 2,3 |
| 000 | 00 | 10 |
| 001 | 01 | 11 |
| 010 | 02 | 12 |
| 011 | 10 | 21 |
| 100 | 12 | 23 |
| 101 | 21 | 31 |
| 110 | 22 | 32 |
| 111 | 23 | 33 |

PULSE AMPLITUDE MODULATED SYSTEM WITH REDUCED INTERSYMBOL INTERFERENCE

RELATED APPLICATION

This application is a continuation of U.S. patent application Ser. No. 10/261,574, filed on Oct. 1, 2002, now U.S. Pat. No. 7,391,834, which is incorporated herein by reference.

FIELD OF THE INVENTION

The invention relates generally to electronic communications, and more specifically to reducing intersymbol interference in a pulse amplitude modulated system.

BACKGROUND OF THE INVENTION

When digital signals are transmitted across electrical connections, the impedances and other characteristics of the electrical connections have an effect on the signal. Conductors are imperfect to varying degrees, and the transmitted power must be of sufficient level to result in an adequate signal-to-noise ratio where the signal is received.

Electrical signals are typically coded, or are transmitted in a way that maintains the integrity of the signal during transmission and provides for accurate detection of the signal at the receiver. Various types of coding are employed and are known by various terms, including channel coding, line coding, and other types of coding. Channel coding typically comprises methods that are directed at maintaining the integrity of the conveyed data sequence, such as by error correction. Line coding involves converting sequences of digital information into patterns determined to be suitable for transmission.

The coded data is then converted to individual electrical pulses according to the coding schemes, and is transmitted across the transmission line or conductor to a receiver. A system designer generally utilizes a combination of channel coding, line coding, and pulse generation techniques to create a communications system that is robust enough to meet the requirements of a particular application.

One combination of coding and pulse generation that is readily implemented in modern electronics is pulse amplitude modulation. These methods involve encoding data as impulses having one of several levels. For example in a 4-PAM (4-way pulse amplitude modulation) scheme, each data impulse takes one of four levels. Each 4-PAM encoded data impulse can therefore hold the equivalent of two bits of traditional digital information, resulting in a dramatic increase in channel capacity where such schemes are appropriate. But, such schemes are not always appropriate or easy to implement. Phenomena such as intersymbol interference and noise can effectively limit the number of amplitudes that can be discerned with a given impulse given specific voltage and power constraints.

Intersymbol interference is a well-known interference mechanism by which a single symbol or impulse results in symbol interference outside the single symbol's pulse period due to oscillation or bandwidth limitation. For example, what starts as a square wave impulse on a bandwidth-limited transmission line may appear at a receiver to more closely resemble a sinc ((sin(x))/x) pulse having oscillations well before and after the original intended pulse period. These oscillations can cause interference with neighboring signals, resulting in one type of intersymbol interference.

What is desired is a system providing the enhanced data rate of pulse amplitude modulation with enhanced intersymbol interference immunity.

BRIEF DESCRIPTION OF THE FIGURES

FIG. 1 shows an example of how a pulse waveform can be deformed by bandwidth limitations and intersymbol interference.

FIG. 2 shows a four-level pulse amplitude modulated signal.

FIG. 3 shows a table illustrating the bits represented by the various signal levels of FIG. 2.

FIG. 4 shows a four-level pulse amplitude modulated signal exhibiting intersymbol interference.

DETAILED DESCRIPTION

Figure 5:
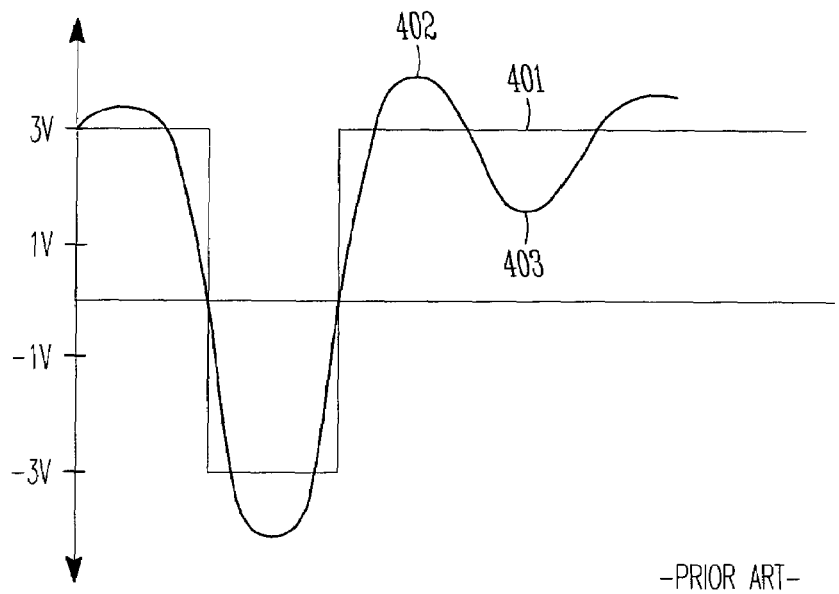
FIG. 5 shows a lookup table used to reduce intersymbol interference a four-level pulse amplitude modulated system, consistent with an embodiment of the present invention.

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides a system having the enhanced data rate of pulse amplitude modulation that further benefits from enhanced intersymbol interference immunity. Intersymbol interference immunity is enhanced in one embodiment of the invention by using a coding method that prevents a full-range voltage step between symbols in a pulse amplitude modulated (PAM) system. Intersymbol interference is often proportional to the change between voltage levels of symbols, making the voltage change between symbols a significant consideration in controlling interference. Elimination of the transitions between the highest and lowest signal levels in a PAM system, combined with minimization of the signal levels crossed in each symbol change in some embodiments, results in a reduction in intersymbol interference.

FIG. 1 illustrates how bandwidth limitations in a system may affect the shape of a digital waveform, such as when a digital signal is transmitted across a bandwidth-limited transmission line or conductor. The original pulse 101 is a square pulse that reflects an instantaneous change between states. If such a pulse is created and applied to a conductive element having a significant inductance or capacitance, the signal becomes bandwidth-limited by the characteristics of the conductive element. When the signal reaches the end of the conductive element, it may bear a greater resemblance to the waveform shown at 102, which has no sharp edges but has oscillations or ringing such as is shown at 103. This phenomenon is one of the major factors contributing to intersymbol interference, which also includes other phenomenon such as time smearing. This intersymbol interference or signal distortion is especially likely to happen when a communication system is pushed to its limits of data capacity, making bandwidth limitation in the conductor an important factor in system design.

One type of communications system that attempts to increase the information contained in a single symbol is Pulse Amplitude Modulation (PAM). FIG. 2 illustrates one example of a 4-PAM system, or a PAM system having four different amplitude levels. In the example shown, the waveform having an initial voltage level of three volts as shown at 201, transitioning to one volt as shown at 202, transitioning to negative one volt as shown at 204, and transitioning to negative three volts as shown at 203 shows how a typical symbol train can be used to represent data.

When these symbols are read in accordance with the table of FIG. 3, we can see that each symbol in a 4-PAM system represents two bits of information, meaning each symbol contains twice as much information as in a simple two-level digital signaling system. Decoding of the sequence formed by symbols 201, 202, 203, and 204 shown in FIG. 2 reveal the bit sequence 11 10 00 01, which in a traditional binary digital system would need to be represented by a full eight symbols.

Although PAM systems appear to allow high-performance systems to carry more information than might otherwise be carried, intersymbol interference can greatly restrict the channel capacity of such a system. FIG. 4 illustrates one such example of how intersymbol interference can result in misreading a symbol.

The waveform 401 is produced, representing the bits 11001111 according to the table of FIG. 3. When the 4-PAM encoded symbols are transmitted across an imperfect conductor and intersymbol interference is produced, the resulting waveform shown at 402 may be read as a result. Although waveform 402 may appear to adequately represent the initially transmitted waveform shown at 401, the waveform with intersymbol interference is closer to the one volt level than to the three volt level in the area shown at 403 and will result in an improperly read symbol at that point. Because intersymbol interference is approximately proportional to the amplitude of change in voltage between symbols, intersymbol interference in the example 4-PAM system illustrated in FIGS. 2-4 is the greatest when a transition between 3v and −3v occurs. FIG. 4 illustrates this, by switching from 3v to −3v, and back to 3v again in successive symbols.

Intersymbol interference can therefore be reduced by preventing such high amplitude steps in signal level, which is done in the following example embodiment of the invention. FIG. 5 illustrates a lookup table that is used to encode the transmitted symbols in a manner that ensures a step from the highest signal level to the lowest signal level does not occur. The resulting output values 0, 1, 2, and 3 of the lookup table correspond to voltage levels that are either sequentially increasing or sequentially decreasing, such that the largest possible voltage change occurs when transitioning from output value 0 to output value 3. If implemented using the voltage levels of FIG. 4, the output symbols 0, 1, 2, and 3 would therefore correspond respectively to voltage levels of −3v, −1v, 1v, and 3v, or respectively to voltage levels of 3v, 1v, −1v, and −3v.

As an example, to encode the incoming binary data 000, it is first determined whether the previous signal level was a low value of 0 or 1, or was a high value of 2 or 3. If the previous signal level was a 0 or 1, the symbol is encoded as 00 according to the table. However, if the previous signal level was 2 or 3, the data is encoded as 10 according to the table, which because its first symbol is a 1 avoids a possible transition from signal level 3 to signal level 0.

Such a method requires an initial signal value, which in some embodiments of the invention is arbitrarily chosen to be a 0. To encode the binary data sequence 011 000 111 011 110 011, the triplets of input data are looked up in the table of FIG. 5 and are converted to a modified 4-PAM sequence. If we arbitrarily choose a starting signal level of zero, the encoded data stream is 0 10 00 23 21 22 21. This encoding system causes the transition between symbols to be a maximum of one step in the majority of instances, and prevents a transition from 0 to 3 or from 3 to 0. When the output symbols from 0-3 are then represented as corresponding voltages, changes between the highest and lowest voltage level are prevented.

If a regular 4-PAM encoding method is used to encode the same data, the corresponding symbol sequence is 120323303, or three-quarters the number of symbols required in the modified 4-PAM encoding system illustrated in FIG. 5. The reduced efficiency of 1.5 bits of information per symbol in the modified 4-PAM system is less than the 2 bits of information in a typical 4-PAM encoding system, but will be able to operate in a given system at a greater speed because of the resulting reduction in intersymbol interference.

Figure 6:
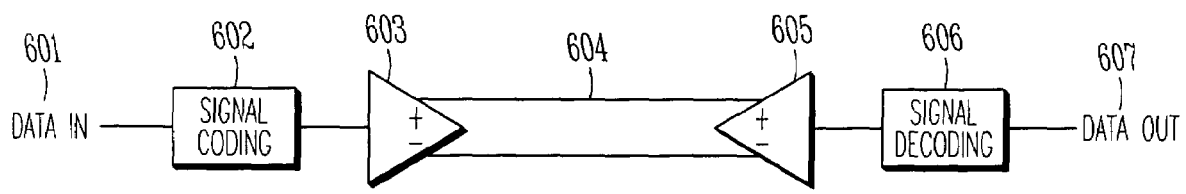
FIG. 6 illustrates a communications system that encodes symbols prior to transmission and decodes symbols after receipt in accordance with an embodiment of the present invention.

FIG. 6 illustrates the configuration of one system such as may be used to implement some embodiments of the present invention. The incoming data 601 is received in a signal coding module 602 that encodes the data such that signal transitions between the highest and lowest signal levels do not occur. Encoding is performed in one embodiment of the invention via a lookup table such as is shown in FIG. 5, although a lookup table is not a requirement of the present invention. The encoded signal is then conveyed to the multi-level driver module 603, that is capable of driving the transmission line 604 with a pulse amplitude modulated multi-level signal. The signal is received in the multi-level receiver module 605, and is conveyed to the signal decoding module 606. The signal decoding module 606 decodes the received signal according to the lookup table, and conveys the decoded information as the data output 607. This system enables transmission of pulse amplitude modulated signals across a transmission line, encoded such that transitions between the highest and lowest signal levels do not occur. This results in a reduction in the magnitude of intersymbol interference, and facilitates faster transmission of encoded symbols in a pulse amplitude modulated system.

Although one modified pulse amplitude modulation system has been discussed here in detail, it is only one example of the invention that illustrates how preventing transitions between the highest and lowest signal levels may be used to reduce intersymbol interference. Other embodiments of the invention may utilize varying coding schemes to prevent transition between the highest and lowest signal levels, and will have varying numbers of amplitudes between which the signal varies. Further, signal encoding and decoding may be performed in other embodiments of the invention by programmable logic arrays (PGAs), decoders, or by any other suitable method or apparatus consistent with the invention as claimed.

Specific embodiments have been illustrated and described herein, but it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. A method of encoding data, comprising:
   receiving digital data; and
   encoding the received data as a pulse amplitude modulated signal such that the amplitude signals do not transition from the highest signal level to the lowest signal level and do not transition from the lowest signal level to the highest signal level.

2. The method of claim 1, wherein the pulse amplitude modulated signal is further encoded such that the step between signal levels is minimized.

3. The method of claim 1, wherein the pulse amplitude modulated signal is encoded as 4-level pulse amplitude modulated data.

4. The method of claim 1, wherein the received data is encoded via a lookup table.

5. The method of claim 1, further comprising transmitting the pulse amplitude modulated signal across a transmission line.

6. The method of claim 5, further comprising:
   receiving the pulse amplitude modulated signal; and
   decoding the received data.

7. The method of claim 6, wherein the data is decoded via a lookup table.

8. An amplitude-modulated data system, comprising:
   a signal encoding module, operable to encode data as a pulse amplitude modulated signal such that the amplitude signals do not transition from the highest signal level to the lowest signal level and do not transition from the lowest signal level to the highest signal level.

9. The amplitude-modulated data system of claim 8, wherein the signal encoding module is further operable to minimize the step between pulse amplitude modulated signal levels.

10. The amplitude-modulated data system of claim 8, wherein the signal encoding module encodes the pulse amplitude modulated signal as 4-level pulse amplitude modulated data.

11. The amplitude-modulated data system of claim 8, wherein the received data is encoded via a lookup table.

12. The amplitude-modulated data system of claim 8, further comprising a transmission line across which the modulated signal is transmitted.

13. The amplitude-modulated data system of claim 12, further comprising:
   a receiver for receiving the pulse amplitude modulated signal; and
   a decoder for decoding the received data.

14. The amplitude-modulated data system of claim 13, wherein the decoder decodes data via a lookup table.

15. A method of receiving encoded data, comprising:
   receiving encoded digital data; and
   decoding the received data, where the received data comprises a pulse amplitude modulated signal such that the amplitude signals do not transition from the highest signal level to the lowest signal level and do not transition from the lowest signal level to the highest signal level.

16. The method of claim 15, wherein the pulse amplitude modulated signal is further encoded such that the step between signal levels is minimized.

17. The method of claim 15, wherein the pulse amplitude modulated signal is 4-level pulse amplitude modulated data.

18. The method of claim 15, wherein the received data is decoded via a lookup table.

* * * * *